UNITED STATES PATENT OFFICE.

JOHN SCHOLL, OF BROOKLYN, NEW YORK.

MANUFACTURE OF MARBLEIZED LEATHER.

SPECIFICATION forming part of Letters Patent No. 545,734, dated September 3, 1895.

Application filed May 31, 1895. Serial No. 551,301. (Specimens.)

*To all whom it may concern:*

Be it known that I, JOHN SCHOLL, a citizen of the German Empire, residing at Brooklyn, in the county of Kings and State of New York, have invented new and useful Improvements in the Manufacture of Marbled Leather, of which the following is a specification.

The object of this invention is the production of leather with a practically indelible marbled surface.

In carrying out my invention I proceed as follows: I take skins—such, for instance, as calf-skins of the best possible quality—and tan the same in any suitable manner, preferably with sumac, taking care to impart to the skins the greatest possible pliability and softness, and while the same are still in a wet state I stretch them, which can be effected by securing the same on frames of wood or other suitable material, so as to keep the pores of the tanned skins as open as possible. The stretched skins are then dried in the open air and then they are uniformly scraped on the flesh side and finally nailed to boards of corresponding sizes. A vat, which must be of sufficient capacity, is charged with fresh water, to which is added a sufficient quantity of common salt so that the oil-colors will float upon the water.

If a skin prepared as above stated and nailed to a board is to be marbled with a single color, I pour the oil-color in single drops upon the surface of the water contained in the vat, and by the motion of the water produced by the drops the oil-color is caused to form various configurations which may be still further varied by imparting to the water in the vat additional movements. These movements can be produced by means of small wooden rods or by means of a fan or by the evolution of a gas in the water contained in the vat—such, for instance, as carbonic acid. In order to effect this last-named purpose a small quantity of carbonate of potash may be added to the water, together with a small quantity of a substance capable of disengaging the carbonic acid from the carbonate. For this purpose a few drops of sulphuric acid may be added to the water in the vat. I have also found that by dissolving a small quantity of carbonate of potassium in the water or by bringing the drops of oil-color floating on the water in contact with carbonate of potassium, the color is spread out so as to form various configurations.

When the configurations of the oil color or colors formed on the surface of the water in the vat correspond to the taste of the operative, he introduces the skin nailed on a board in an inclined direction, so that the surface of the skin takes up the color or colors floating on the water. If it is desired to color skins with various colors, such colors may be succesively introduced into the same vat, or several vats may be provided which contain the different colors. The colored skins are dried in a heated room and then they are removed from the boards and passed through slightly-heated calendering-rolls. The loose color existing on each skin is removed by means of a soft brush and the skin is again passed through calendering-rolls. After this has been done, I saturate the colored side of the skin with a solution of shellac in alcohol. After the skin has become dry, I take a pad of wool, saturate the same with the polishing solution, then wrap up the saturated pad in a soft linen cloth, so that the polishing solution passes through this wrapper, and then I rub the surface of the skin with this pad in circular lines, continuing this operation until the surface of the skin has attained the desired luster or brilliancy, which is finally reached by applying to the linen cloth containing the pad a small quantity of oil.

By the process of drying, calendering and polishing the skins become somewhat hard and their original pliability can be restored by scraping their backs with a suitable knife.

The colors best suited for my purpose are oil-colors. Aniline colors, whether soluble in water or in alcohol, are not suitable for my purpose.

The quantities of the constituents of the composition for carrying out my process are as follows: Water, one hundred pounds; common salt, from two to three pounds; carbonate of potassium, one ounce. The quantity of salt changes according to the specific gravity of the oil-colors used. Instead of dissolving the carbonate of potassium in the water, very small quantities of powdered carbonate of potassium may be sprinkled directly upon the lumps of coloring-matter floating on the water.

What I claim as new, and desire to secure by Letters Patent, is—

1. The process of providing leather with a marbled surface which consists in providing a body of water, dissolving therein a quantity of common salt, floating coloring matter on the surface of this solution, and then exposing the leather to the action of the coloring matter, substantially as described.

2. The process of providing leather with a marbled surface, which process consists in providing a body of water, dissolving therein a quantity of common salt, floating coloring matter on the surface of the solution, agitating the coloring matter, and then exposing the leather to the action thereof, substantially as described.

3. The process of providing leather with a marbled surface which consists in providing a body of water, dissolving therein a quantity of common salt, floating coloring matter on the surface thereof, bringing carbonate of potassium into contact with said coloring matter, and then exposing the leather to the action of the coloring matter, substantially as described.

In testimony whereof I have hereunto set my hand in the presence of two subscribing witnesses.

JOHN SCHOLL.

Witnesses:
WILLIAM C. HAUFF,
E. F. KASTENHUBER.